Nov. 14, 1967    H. LEIBER    3,352,388
APPARATUS FOR PREVENTING THE SKIDDING OF VEHICLE WHEELS
Filed May 11, 1966
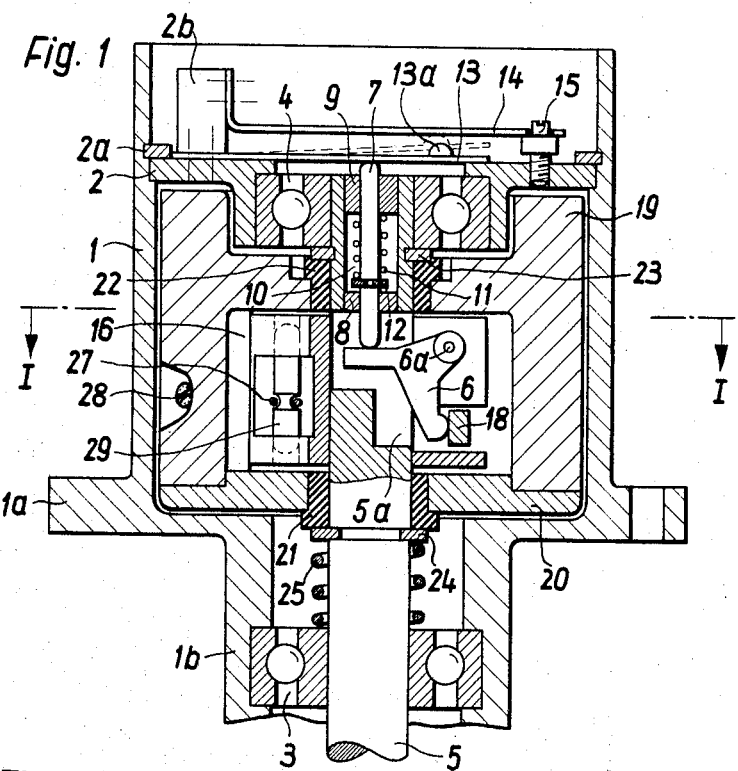
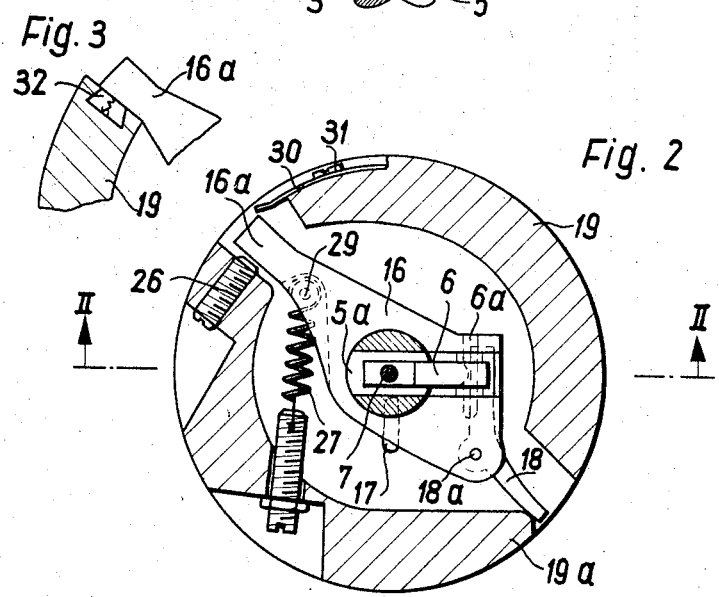
Inventor:
Heinz Leiber
by Ernest G Montague
attorney

United States Patent Office 3,352,388
Patented Nov. 14, 1967

3,352,388
APPARATUS FOR PREVENTING THE SKIDDING OF VEHICLE WHEELS
Heinz Leiber, 2 Im Emklert, 6906 Leimen, Germany
Filed May 11, 1966, Ser. No. 549,205
Claims priority, application Germany, May 14, 1965,
G 43,597
3 Claims. (Cl. 188—181)

ABSTRACT OF THE DISCLOSURE

An apparatus for preventing the skidding of vehicle wheels, comprising a housing adapted to be secured to a brake plate of a vehicle, and an auxiliary shaft rotatably mounted in the housing and adapted to be rotated by the vehicle wheel, and a spring-biased tappet member axially movable in the auxiliary shaft. A rotary mass is mounted for rotation about the axis of the auxiliary shaft and a first double-armed shifting lever is provided having a first rotary axis disposed spaced apart from and perpendicularly to the axis of the auxiliary shaft and engages the tappet member. A second double-armed shifting lever is provided, having a second rotary axis which is disposed parallel to the axis of the auxiliary shaft and engages the first lever. The first and second rotary axes of the first and second levers, respectively, form an unchangeable system, rotating about the axis of the auxiliary shaft when the vehicle wheel rotates and the tappet member is axially shifted by the levers upon a rotary motion of the rotary mass relative the auxiliary shaft.

---

The present invention relates to an apparatus for preventing the skidding of vehicle wheels.

In devices for skidding protection of vehicle wheels, it is of importance to measure with high sensitivity the angular-decelerations or accelerations of the individual wheels or wheel sets, so that upon the slightest deviations of predetermined limit values upwardly or downwardly, a signal is created, which is usable for correcting the brake or driving system. The known angular retarding devices for vehicle wheels do not permit a sufficiently sensitive measuring.

It is, therefore, one object of the present invention to provide an apparatus for preventing the skidding of vehicle wheels which provides angular retarding or decelerating members for vehicle wheels, in which the rotation of a rotary mass relative to a shaft, which is drivingly connected with the wheel, is transformed into a longitudinal moment of a pin, tappet or the like disposed in the rotary axis.

It is another object of the present invention to provide an apparatus for preventing the skidding of vehicle wheels, wherein the known angular retarding members of this type are improved such, that a possibly smaller relative rotary angle of the rotary mass causes a possibly large axial displacement of a pin and that during the transformation of the movement as little as possible of friction energy is lost. In particular, the present invention resolves this problem such, that two two-armed transforming levers effective in series are provided, the rotary axis of the levers forming an unchangeable system rotating with an auxiliary shaft about the axis of the latter.

It is still another object of the present invention to provide an apparatus for preventing the skidding of vehicle wheels, wherein the two transforming levers are mounted on a connecting member secured to the auxiliary shaft and the rotary axis of the outer lever is disposed parallel and the rotary axis of the inner lever is disposed at a distance perpendicularly to the auxiliary shaft.

An apparatus for preventing the locking of vehicle wheels is known in which an axially displaceable tappet is connected with the rotary mass by means of a threaded connection, so that the rotation of the rotary mass brings about an axial displacement of the tappet. By this arrangement an effective axial stroke is obtainable only after about a complete revolution of the threaded member, so that the responsive time is non-usably low.

In a known exhaust valve for control means for skidding protection, a pair of rollers is provided on the tappet, the axis of the pair of rollers cutting perpendicularly the axis of the rotary mass. The rollers are disposed normally in recesses of a running path connected with the rotary mass and are pushed out of the recesses during relative rotation of the latter, so that the tappet is displaced. Yet, also in connection with this or similar known arrangements with balls, the axial displacement remains small, particularly appreciably smaller than the corresponding peripheral path of the rotary mass. If one would change the inclination of the running path recess in favor of a larger axial displacement of the tappet, it could be obtained only with a high friction wear at this point.

The transforming levers, designed in accordance with the present invention, permit, however, in case of corresponding measurements of the lever arms, to render the axial displacement equal or, if necessary, even larger than the complementary peripheral path of the rotary mass. The axial displacement can be employed for the operation of a valve, a control piston, or in accordance with a preferred embodiment also for the operation of an electric switching member. The levers can be mounted, for instance, in ball bearings friction poor and in a permanent manner. The engaging points bringing about a connection of forces of the lever arms relative to each other and of the lever arms, respectively, with the tappet and the rotary mass, can be formed extremely friction poor by cooperation of ball-shaped with plane surfaces.

With these and other objects in view which will become apparent from the following detailed description, the present invention will be clearly understood in connection with the accompanying drawings, in which:

FIGURE 1 is a longitudinal section taken along the lines 1—1 of FIG. 2 of an apparatus, designed in accordance with the present invention;

FIG. 2 is a section along the lines 2—2 of FIG. 1; and

FIG. 3 is a fragmentary section indicating another embodiment of the abutment between the rotary mass and the connecting member.

Referring now to the drawings and in particular to FIGS. 1 and 2, the apparatus for preventing the skidding of vehicle wheels comprises a housing 1, which receives the entire device and is to be secured by means of a flange 1a on the brake plate of a vehicle. An auxiliary shaft 5 is mounted by means of two ball bearings 3 and 4 in a tubular extension 1b, on the one hand, and an intermediate wall 2, on the other hand. A securing ring 2a serves the purpose of locating the inserted intermediate wall 2. The auxiliary shaft 5 is driven directly by the wheel by particular means (not shown). The auxiliary shaft 5 has about at its center an opening 5a, into which a shifting lever 6 and a tappet 7 project. Two bearing bushings 8 and 9 which are inserted into a central bore 10 of the auxiliary shaft 5, extending from the end face up to the opening 5a, hold the tappet 7 longitudinal displaceable in the axis of the auxiliary shaft 5. A pressure spring 11 is disposed between the bearing bushing 9 and a safety ring 12, which pressure spring 11 retains in engagement one end of the tappet 7 on the switching lever 6. If the lever 6 is turned clockwise (FIG. 1), the tappet 7 lifts a blade spring 13 disposed on top of the intermediate wall 2, into the position shown in dotted lines and thereby brings about engagement of a contact member 13a with a second spring blade 14 disposed on top of the first spring plate 13 and arranged substantially parallel thereto. The blade spring 13 is secured directly to the blade spring 14 by means of an insulating connecting member 2b on an intermediate wall 2. The blade spring 14 can be adjusted by means of a set screw 15.

A connecting member 16 is mounted on the auxiliary shaft 5 in the range of the opening 5a and secured by means of a pin 17. This connecting member 16 serves the purpose of mounting the shifting lever 6 by means of a bearing pin 6a which is arranged spaced apart perpendicularly to the axis of the auxiliary shaft 5. A second shifting lever 18, which is particularly clearly shown in FIG. 2, is mounted by means of a bearing pin 18a in the connecting member 16, which bearing pin 18a is disposed parallel to the axis of the auxiliary shaft 5. FIG. 1 discloses one arm of the lever 18 in section, which engages a ball faced arm of the lever 6.

The actual rotary mass 19 has substantially the shape of a dish which surrounds jointly with a cover 20 the connecting member 16 and the two shifting levers 6 and 18. The rotary mass 19 is mounted by means of slide bearings 21 and 22, the axial displacement of which on the auxiliary shaft 5 is prevented by securing rings 23 and 24. Furthermore, a pressure spring 25 tensioned between the safety ring 24 and the ball bearing 3, secures the auxiliary shaft 5 in its axial position relative to the housing 1.

A finger 16a of the connecting member 16 is retained in a position engaging an abutment screw 26 of the rotary mass 19 by means of a spring 27. One end of the spring 27 is secured by means of a threaded bolt 28 to the rotary mass 19, while the other end surrounds a pin 29 secured to the connecting member 16. A blade spring 30 is provided at the outer periphery of the rotary mass 19 by means of a screw bolt 31 for the damping of possible buffer oscillations of the rotary mass 19.

If the vehicle is standing still or is moving in a non-braked condition, the connecting member 16 and the rotary mass 19 engage each other. The spring 11 pushes the tappet 7 against the lever 6, the latter engages the lever 18 and the latter in turn engages the rotary mass at the point 19a. The contact springs 13 and 14 do not engage each other. It is now assumed, that during a forward movement of the vehicle the auxiliary shaft 5, the connecting member 16 and the rotary mass 19 turn clockwise (FIG. 2). If now during braking a rotation retardation takes place, which surpasses the limit value given by the force of the spring 27 and the setting of the contact springs 13 and 14, a relative rotation of the rotary mass 19, relative to the connecting member 16, against the force of the spring 27 takes place. Due to this rotation, the lever 18 is turned counter-clockwise (FIG. 2) and the lever 6 accordingly clockwise (FIG. 1), so that the tappet 7 lifts the blade spring 13 and, thereby, closes the contact between the contact springs 13 and 14. By means of an electromagnet, under certain circumstances, by arrangement of an intermediate electrical amplifier, the brake device can now, for instance, be controlled. As soon as the rotary retardation relaxes and a negative retardation takes place, respectively, due to the fact that the wheels grip again the ground, the rotary mass 19 engages again the connecting member 16, the levers 6 and 18 swing backwardly, the contact between the contact springs 13 and 14 is opened and the brake is rendered effective again to a greater extent. This play can and should repeat as fast as possible and repeatedly in accordance with the present invention.

Referring now again to the drawings and in particular to FIG. 3, a permanent magnet 32 is provided at the point where the finger 16a of the connecting member 16 engages the rotary mass 19. In this embodiment, the permanent magnet 16a is inserted into the rotary mass 19. The holding force of the permanent magnet 32 relaxes very fast, upon separating the two parts. It is possible by dimensioning this permanent magnet under circumstances also jointly with the cooperation of the spring 27, to vary the limit value of the rotary acceleration and the responsive characteristic according to requirements.

While I have disclosed two embodiments of the present invention, it is to be understood that these embodiments are given by example only and not in a limiting sense, the scope of the present invention being determined by the objects and the claims.

I claim:
1. An apparatus for preventing the skidding of vehicle wheels, comprising
   a housing adapted to be secured to a brake plate of a vehicle,
   an auxiliary shaft rotatably mounted in said housing, and adapted to be rotated by the vehicle wheel,
   a spring-biased tappet member axially movable in said auxiliary shaft,
   a rotary mass mounted for rotation about the axis of said auxiliary shaft,
   a first double-armed shifting lever, having a first rotary axis disposed spaced apart from and perpendicularly to the axis of said auxiliary shaft and engaging said tappet member,
   a second double-armed shifting lever, having a second rotary axis disposed parallel to the axis of said auxiliary shaft and engaging said first lever and adapted to be moved by said rotary mass,
   a said first and second rotary axes of said first and second levers, respectively, forming an unchangeable system, rotating about said axis of said auxiliary shaft when the vehicle wheel rotates, and
   said tappet member being axially shifted by movement of said levers upon a rotary motion of the rotary mass relative to said auxiliary shaft.

2. The apparatus, as set forth in claim 1, which includes a connecting member secured to said auxiliary shaft, and
   said first and second levers being pivotally mounted on said connecting member.

3. The apparatus, as set forth in claim 2, which includes a permanent magnet inserted in said rotary mass and engaging said connecting member and retaining said rotary mass in position relative to said auxiliary shaft, the holding force of said permanent magnet being overcome upon rotary movement of said rotary mass relative to said auxiliary shaft.

References Cited

UNITED STATES PATENTS

| | | | |
|---|---|---|---|
| 2,365,180 | 12/1944 | Eksergian | 200—61.46 |
| 2,747,041 | 5/1956 | Thomson | 200—61.46 |
| 3,165,180 | 1/1965 | Inderau | 188—181 X |

DUANE A. REGER, *Primary Examiner.*